(12) United States Patent
Chiang et al.

(10) Patent No.: US 8,760,394 B2
(45) Date of Patent: Jun. 24, 2014

(54) PORTABLE ELECTRONIC DEVICE AND SWITCHING METHOD OF ICON

(75) Inventors: Ching-Liang Chiang, Taoyuan County (TW); Tsung-Yuan Ou, Taoyuan County (TW); Yi-Shen Wang, Taoyuan County (TW)

(73) Assignee: HTC Corporation, Taoyuan County (TW)

( * ) Notice: Subject to any disclaimer, the term of this patent is extended or adjusted under 35 U.S.C. 154(b) by 303 days.

(21) Appl. No.: 13/022,558

(22) Filed: Feb. 7, 2011

(65) Prior Publication Data

US 2012/0061217 A1    Mar. 15, 2012

(30) Foreign Application Priority Data

Sep. 10, 2010 (TW) .............................. 99130678 A

(51) Int. Cl.
*G09G 5/00* (2006.01)

(52) U.S. Cl.
USPC ........................................ 345/156; 345/158

(58) Field of Classification Search
CPC ................ G06F 1/1626; G06F 1/1662; G06F 2200/1614; G06F 3/0238
USPC ................ 345/156–184; 200/310; 341/22–34
See application file for complete search history.

(56) References Cited

U.S. PATENT DOCUMENTS

| | | | |
|---|---|---|---|
| 8,265,705 B2* | 9/2012 | Lee | 455/566 |
| 2005/0243069 A1* | 11/2005 | Yorio et al. | 345/173 |
| 2006/0061542 A1* | 3/2006 | Stokic | 345/156 |
| 2006/0132458 A1* | 6/2006 | Garfio et al. | 345/173 |
| 2007/0029172 A1* | 2/2007 | Choi et al. | 200/1 B |
| 2007/0236959 A1* | 10/2007 | Tolbert et al. | 362/616 |
| 2008/0150767 A1* | 6/2008 | Lawton et al. | 341/22 |
| 2009/0154138 A1* | 6/2009 | Isoda et al. | 362/97.1 |
| 2009/0284397 A1* | 11/2009 | Lee et al. | 341/23 |
| 2010/0097321 A1* | 4/2010 | Son et al. | 345/169 |
| 2010/0108482 A1* | 5/2010 | Chen et al. | 200/314 |
| 2010/0134431 A1* | 6/2010 | Tsai et al. | 345/173 |
| 2010/0137033 A1* | 6/2010 | Lee | 455/566 |
| 2010/0141587 A1* | 6/2010 | Takahashi et al. | 345/169 |

(Continued)

FOREIGN PATENT DOCUMENTS

| | | |
|---|---|---|
| CN | 101751175 | 6/2010 |
| CN | 101751176 | 6/2010 |

(Continued)

OTHER PUBLICATIONS

"Office Action of Europe Counterpart Application", issued on Jan. 3, 2013, p. 1-p. 6.

(Continued)

*Primary Examiner* — Quan-Zhen Wang
*Assistant Examiner* — Chun-Nan Lin
(74) *Attorney, Agent, or Firm* — Jianq Chyun IP Office

(57) ABSTRACT

A portable electronic device including a main body, a physical key module, and a control module is provided. The physical key module assembled to the main body has a display surface, and the physical key module includes at least two overlapped icon units. The control module electrically connected to the physical key module activates one of the icon units according to an operating state of the main body, so that an icon of the activated icon unit is displayed on the display surface. A method for switching icons is also provided.

11 Claims, 6 Drawing Sheets

(56) References Cited

U.S. PATENT DOCUMENTS

2010/0328111 A1* 12/2010 O'Neill et al. .................. 341/24
2011/0065480 A1* 3/2011 Kim et al. ..................... 455/566
2011/0164163 A1* 7/2011 Bilbrey et al. ........... 348/333.01
2012/0055770 A1* 3/2012 Chen ............................. 200/310

FOREIGN PATENT DOCUMENTS

| EP | 1628459 | 2/2006 |
| EP | 2034385 | 3/2009 |
| EP | 2063344 | 5/2009 |
| TW | 201020887 | 6/2010 |

OTHER PUBLICATIONS

"Extended European Search Report of Europe Counterpart Application", issued on Oct. 6, 2011, p. 1-p. 7, in which the listed references were cited.

"Office Action of Taiwan Counterpart Application", issued on Nov. 5, 2013, p. 1-p. 9, in which the listed reference was cited.

"Office Action of China Counterpart Application", issued on Oct. 24, 2012, p. 1-p. 10, in which the listed references were cited.

* cited by examiner

PORTABLE ELECTRONIC DEVICE AND SWITCHING METHOD OF ICON

CROSS-REFERENCE TO RELATED APPLICATION

This application claims the priority benefit of Taiwan application serial no. 99130678, filed on Sep. 10, 2010. The entirety of the above-mentioned patent application is hereby incorporated by reference herein and made a part of this specification.

BACKGROUND

1. Field of the Invention

The application relates to a portable electronic device. Particularly, the application relates to a portable electronic device capable of switching icons.

2. Description of Related Art

To cope with modern busy lifestyle, various portable electronic devices with less space occupation are continually developed, for example, personal digital assistant (PDA) mobile phones, smart phones or mobile computers, etc. These portable electronic devices not only have various functions of a conventional communication device, but also allow a user to write documents, send and receive emails, browse websites, or use instant messaging software through an inbuilt windows operating system therein. Namely, these portable electronic devices are not only used for making phone calls, but are also used to provide diversified functions as that does of a smaller personal computer.

Generally, in these portable electronic devices, a display direction of a screen disposed on a main body is varied along with an operating state of the main body. For example, when a phone call is made, the main body is generally in a portrait mode, so that the display direction of the screen is also a portrait direction. When a website is browsed or multimedia is played, the portable electronic device is generally rotated to a landscape mode, so that the screen is changed to the landscape mode to facilitate operations and a viewing effect of the user.

However, physical keys disposed on the portable electronic device cannot be changed along with the operating state of the main body. For example, icons on the physical keys are generally in line with the portrait mode of the portable electronic device, so that when the portable electronic device is changed to the landscape mode, a problem that a direction of the icons is not complied with the display direction of the screen is occurred. Therefore, the user may have trouble in operation, so that operability of the portable electronic device is decreased.

Moreover, the portable electronic device requiring features of lightness, slimness, shortness and smallness is limited in size, so that a number of the physical keys thereon and functions thereof are also limited. Therefore, to achieve more functionality of the physical keys under limited space becomes an important issue for those related practitioners.

SUMMARY OF THE INVENTION

The application is directed to a portable electronic device, in which a physical key module may switch different icons.

The application provides a method for switching icons, by which different icons are switched according to an operating state of a main body.

The application provides a portable electronic device including a main body, a physical key module and a control module. The physical key module is assembled to the main body. The physical key module has a display surface, and includes at least two icon units overlapped to each other. The control module is electrically connected to the physical key module. The control module activates one of the icon units according to an operating state of the main body, so that an icon of the activated icon unit is displayed on the display surface.

The application provides a method for switching icons, which is adapted to a portable electronic device. The portable electronic device includes a main body, a physical key module and a control module. The physical key module is assembled to the main body. The physical key module has a display surface, and includes a first icon unit and a second icon unit overlapped to the first icon unit. The second icon unit is located between the first icon unit and the display surface. The first icon unit has at least a first icon, and the second icon unit has at least a second icon. The control module is electrically connected to the first icon unit and the second icon unit. The method for switching icons is as follows. The control module determines an operating state of the main body. When the main body is in a first operating state, the control module activates the first icon unit and disables the second icon unit, so that the first icon is displayed on the display surface. When the main body is in a second operating state, the control module activates the second icon unit and disables the first icon unit, so that the second icon is displayed on the display surface.

According to the above descriptions, the control module detects the operating state of the main body, and accordingly activates one of the overlapped icon units, so that the icon of the activated icon unit is displayed on the display surface. In this way, the physical key module of the portable electronic device may display different icons along with different operating states.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

A screen may display a virtual icon or a virtual key, though in the following embodiments, physical keys are taken as an example for description.

Figure 1A:
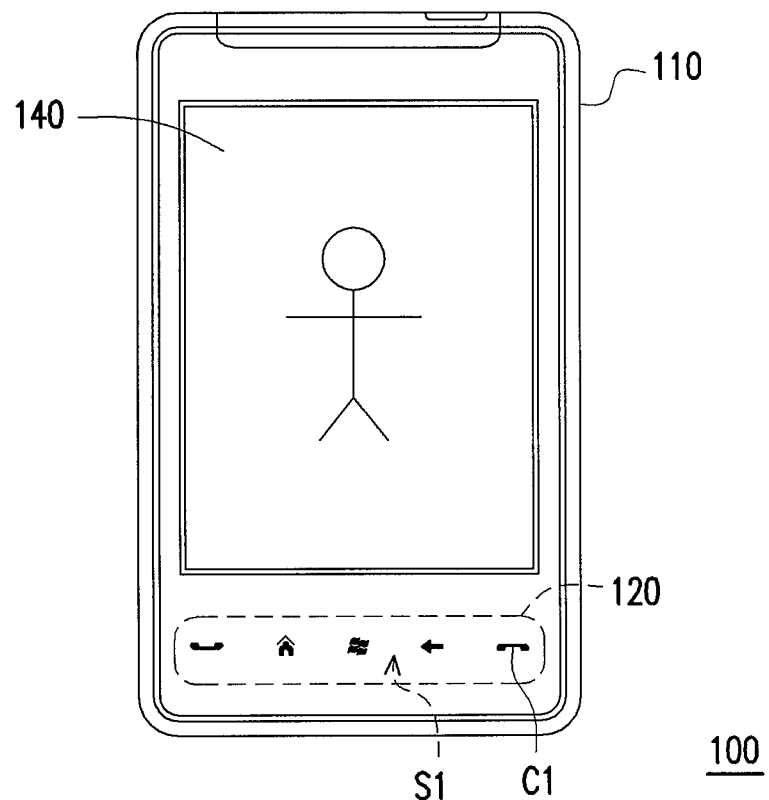
FIG. 1A and FIG. 1B are schematic diagrams illustrating a portable electronic device in different operating states according to an embodiment of the invention.
Figure 1B:
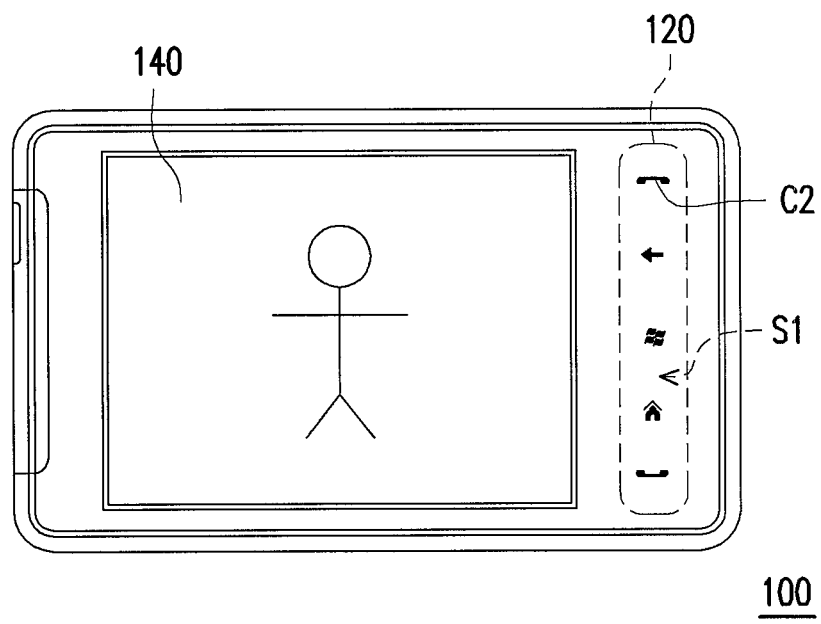
Figure 2:
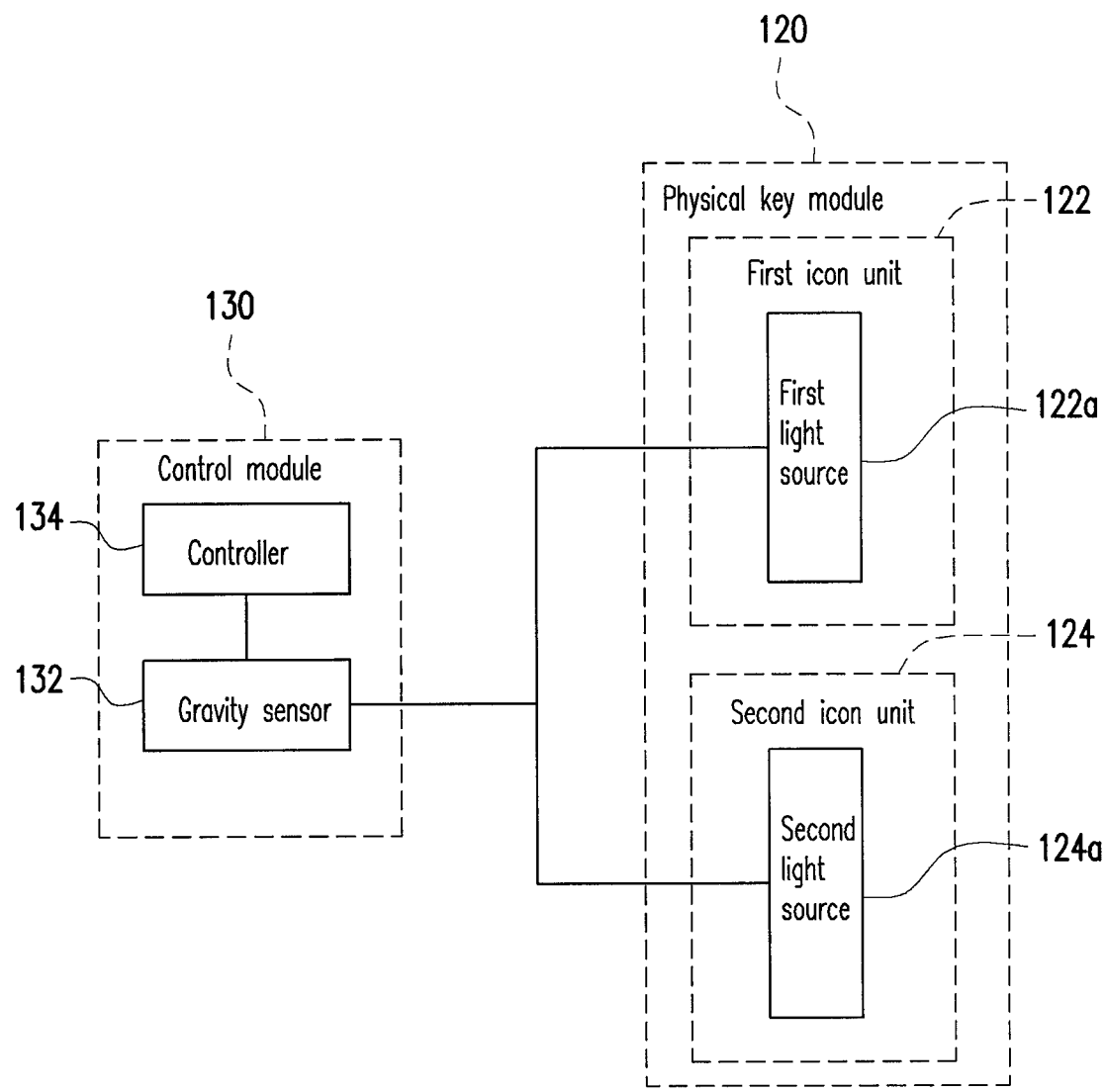
FIG. 2 is a block diagram illustrating related components in a portable electronic device of FIG. 1A and FIG. 1B.

FIG. 1A and FIG. 1B are schematic diagrams illustrating a portable electronic device in different operating states according to an embodiment of the invention. FIG. 2 is a block diagram illustrating related components in the portable electronic device of FIG. 1A and FIG. 1B, in which coupling relations of the components are illustrated.

Referring to FIG. 1A, FIG. 1B and FIG. 2, in the present embodiment, the portable electronic device 100 is, for example, a personal digital assistant (PDA) mobile phone, a smart phone or a mobile computer, which is not limited by the application. The portable electronic device 100 includes a main body 110, a physical key module 120 and a control module 130. The physical key module 120 is assembled to the main body 110. The physical key module 120 has a display surface S1, and includes a first icon unit 122 and a second icon unit 124. The control module 130 is electrically connected to the physical key module 120. The control module 130 activates one of the icon units 122 and 124 according to an operating state of the main body 110, so that an icon of the activated icon unit 122 or 124 is displayed on the display surface S1.

In the present embodiment, when the main body 110 is in a first operating state (shown in FIG. 1A), for example, a portrait mode, the portable electronic device 100 may implement a communication function. Now, a first icon C1 of the first icon unit 122 is displayed on the display surface S1, which is in line with a display direction of a content currently displayed on a screen 140 of the main body 110. Moreover, when the main body 110 is in a second operating state (shown in FIG. 1B), for example, a landscape mode, the portable electronic device 100 may implement a multimedia playing function. Compared to the first operating state, the second operating state is substantially a result of rotating the main body 110 of the first operating state by 90 degrees. Now, the physical key module 120 switches to display a second icon C2 of the second icon unit 124, so that the icon C2 displayed on the display surface S1 is in line with a display direction of a content currently displayed on the screen 140.

Figure 3:
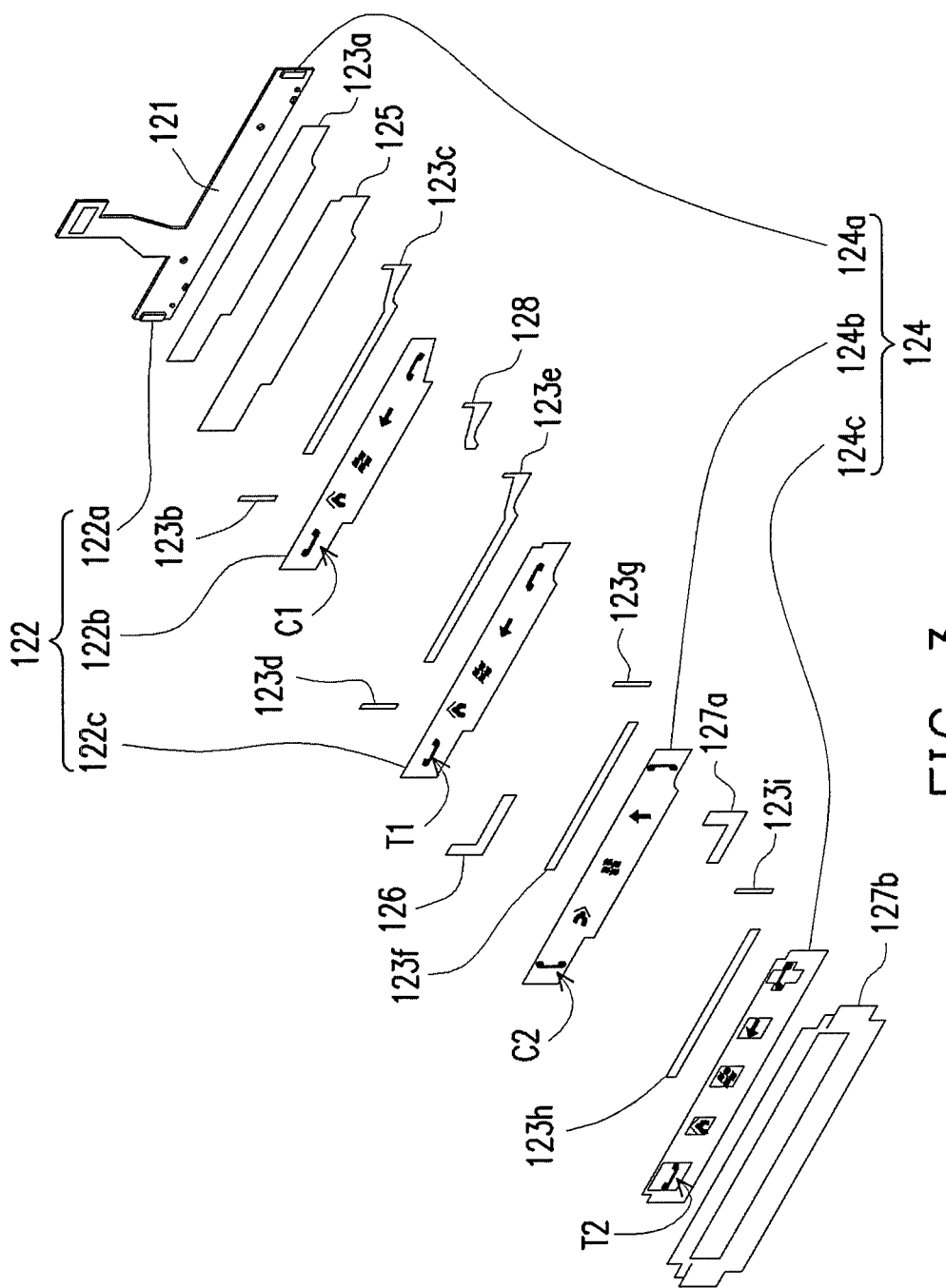
FIG. 3 is an exploded view of a physical key module in a portable electronic device of FIG. 1A and FIG. 1B.

FIG. 3 is an exploded view of a physical key module in the portable electronic device of FIG. 1A and FIG. 1B. Referring to FIG. 3, in the physical key module 120 of the present embodiment, the first icon unit 122 and the second icon unit 124 are mutually overlapped in structure and are assembled to the main body 110. The control module 130 switches to activate the first icon unit 122 or the second icon unit 124 according to different operating states of the main body 110, so as to display the first icon C1 or the second icon C2 on the same display surface S1. In this way, it is unnecessary to configure additional keys corresponding to different operating states on the main body 110 of the portable electronic device 100, and utilization of the physical key module 120 and the control module 130 can satisfy key functional requirements of the main body 110 in different operating states.

According to the above descriptions, in the portable electronic device 100 of the present embodiment, the physical key module 120 includes the mutually overlapped icon units 122 and 124, and one of the icon units 122 and 124 is activated after the control module 130 detects the operating state of the main body 110, so that the physical key module 120 of the portable electronic device 100 can produce the icon C1 in line with the display direction of the screen 140 in case of the portrait mode, or produce the icon C2 in line with the display direction of the screen 140 in case of the landscape mode. In this way, the portable electronic device 100 may effectively save a space used for disposing the additional keys, so that a profile of lightness, slimness, shortness and smallness and better functionality of the portable electronic device 100 are achieved.

Figure 4:
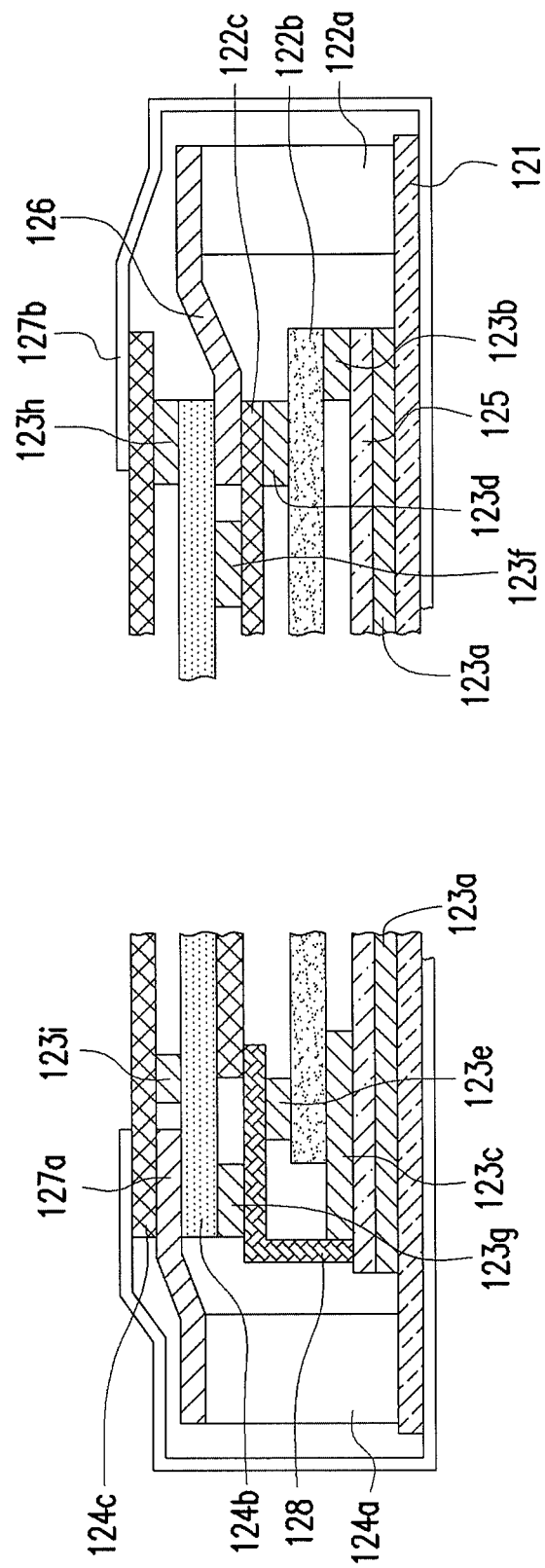
FIG. 4 is a cross-sectional view of a physical key module of FIG. 3 after assembly.

FIG. 4 is a cross-sectional view of a physical key module of FIG. 3 after assembly. Referring to FIG. 2 to FIG. 4, in the present embodiment, the first icon unit 122 includes a first light source 122a and a first light-guiding film 122b. The second icon unit 124 includes a second light source 124a and a second light-guiding film 124b. The first light source 122a and the second light source 124a are, for example, light emitting diodes, which are packaged on a flexible circuit board 121 in opposite for electrically connecting the control module 130. The first light-guiding film 122b is disposed aside the first light source 122a, and the first light-guiding film 122b has the first icon C1. The second light-guiding film 124b is disposed aside the second light source 124a, and the second light-guiding film 124b has the second icon C2. In the present embodiment, the first icon C1 and the second icon C2 are respectively microstructures on the first light-guiding film 122b and the second light-guiding film 124b that are formed by surface treatment. However, the invention is not limited thereto, and in another embodiment that is not illustrated, the icons on the light-guiding films can also be formed by a printing process.

In the present embodiment, an orthogonal projection of the first icon C1 on the display surface S1 is partially coincident to an orthogonal projection of the second icon C2 on the display surface S1. In detail, a profile of the first icon C1 is complied with a profile of the second icon C2, and after the orthogonal projection of the first icon C1 on the display surface S1 is rotated by 90 degrees, it is completely coincident to the orthogonal projection of the second icon C2 on the display surface S1. In this way, when the main body 110 is changed between the portrait mode and the landscape mode, the display surface S1 can respectively display the first icon C1 and the second icon C2 in line with the display direction of the screen 140. However, in the invention is not limited thereto, and in other embodiments that are not illustrated, a main body may also include a plurality of icon units mutually overlapped to each other, which are used for corresponding to a plurality of operating states of the main body, so that the portable electronic device may have better functionality.

Referring to FIG. 2, in the present embodiment, the control module 130 includes a controller 132 and a gravity sensor 134 electrically connected to the controller 132. The controller 132 is electrically connected to the first light source 122a and the second light source 124a. The gravity sensor 134 is used for sensing the operating state of the main body 110 to provide a basis to the controller 132 for determination. When the gravity sensor 134 senses that the main body 110 is in the first operating state, the controller module 130 activates the first light source 122a and disables the second light source 124a, so that light of the first light source 122a is transmitted to the first light-guiding film 122b, and the first icon C1 is accordingly displayed on the display surface S1 (shown in FIG. 1A). Conversely, when the gravity sensor 134 senses that the main body 110 is in the second operating state, the controller module 130 disables the first light source 122a and activates the second light source 124a, so that light of the second light source 124a is transmitted to the second light-guiding film 124b, and the second icon C2 is accordingly displayed on the display surface S1 (shown in FIG. 1B).

The first icon unit 122 further includes a first light-shielding sheet 122c, which is disposed on the first light-guiding film 122b. The first light-shielding sheet 122c has a first light-pervious region T1, and the first light-pervious region T1 corresponds to the first icon C1 on the first light-guiding film 122b. A profile of the first light-pervious region T1 is complied with a profile of the first icon C1, and an area of the first light-pervious region T1 is smaller than or equal to an area of the first icon C1. In this way, the first light-shielding sheet 122c can shield a halo part of the first icon C1, so that an image of the first icon C1 displayed on the first display S1 can be more clear.

Moreover, the second icon unit 124 further includes a second light-shielding sheet 124c, which is disposed on the second light-guiding film 124b. The second light-shielding sheet 124c has a second light-pervious region T2, and the second light-pervious region T2 corresponds to the second icon C2 and the first icon C1. Moreover, an area of the second light-pervious region T2 is greater than or equal to the area of the first icon C1 and the area of the second icon C2. In this way, images of the first icon C1 and the second icon C2 are all pervious to the second light-pervious region T2 and displayed on the display surface S1.

Moreover, the physical key module 120 further includes a third light-shielding sheet 126 and a fourth light-shielding sheet 128, wherein the third light-shielding sheet 126 is disposed between the first light source 122a and the second light-guiding film 124b for shielding the light of the first light source 122a from transmitting to the second light-guiding film 124b. The fourth light-shielding sheet 128 is disposed between the second light source 124a and the first light-guiding film 122b for shielding the light of the second light source 124a from transmitting to the first light-guiding film 122b. In this way, in the mutually overlapped first icon unit 122 and the second icon unit 124 of the physical key module 120, the above structures are used to avoid mutual interference of the lights of the first light source 122a and the second light source 124a, so that the first icon C1 and the second icon C2 may have better imaging effects.

On the other hand, the physical key module 120 further includes a base substrate 125, a plurality of bonding tapes 123a-123i, a fifth light-shielding sheet 127a and a sixth light-shielding sheet 127b. The base substrate 125 is disposed between the flexible circuit board 121 and the first light-guiding film 122b, and in the present embodiment, the fourth light-shielding sheet 128 is disposed on the base substrate 125. The fifth light-shielding sheet 127a is disposed between the second light source 124a, the second light-guiding film 124b and the second light-shielding sheet 124c, and is used for preventing the light of the second light source 124a from directly emitting out of the second icon unit 124, and the fifth light-shielding sheet 127a also has a reflection property for reflecting the light of the second light source 124a to the second light-guiding film 124b. The sixth light-shielding sheet 127b is disposed on the second light-shielding sheet 124c, and is used for assisting the second light-shielding sheet 124c to shield stray light emitted out of the second icon unit 124 through the second light-shielding sheet 124c.

Moreover, the bonding tapes 123a-123i are disposed between any two adjacent components, so as to construct the physical key module 120 of the present embodiment. Here, the structure of the physical key module 120 shown in FIG. 3 and FIG. 4 is only an exemplary embodiment of the invention, and any structure that includes the aforementioned mutually overlapped first icon unit 122 and the second icon unit 124 is construed to be within the scope of the present embodiment.

Figure 5A:
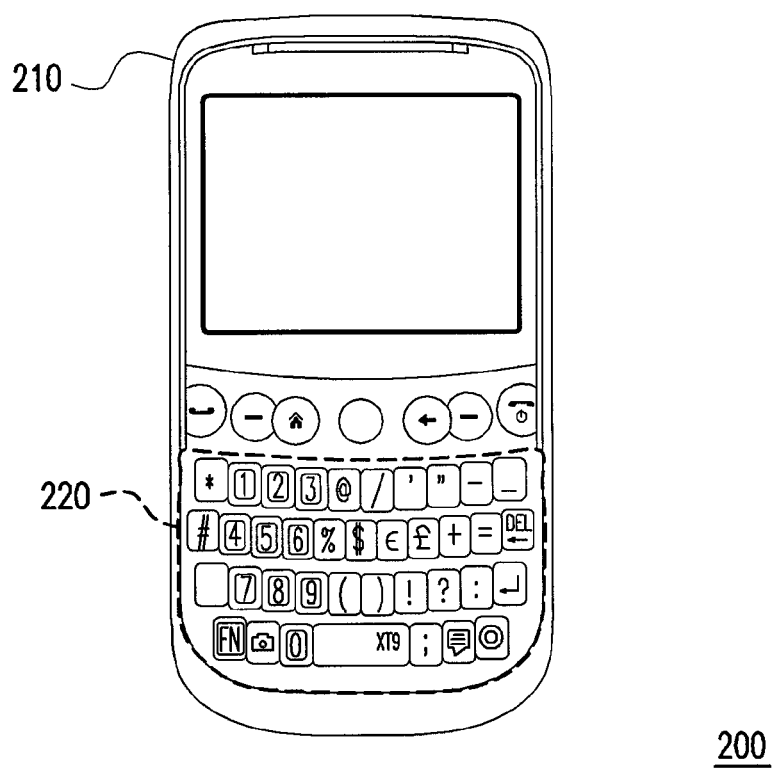
FIG. 5A and FIG. 5B are schematic diagrams illustrating a portable electronic device in different operating states according to another embodiment of the invention.
Figure 5B:
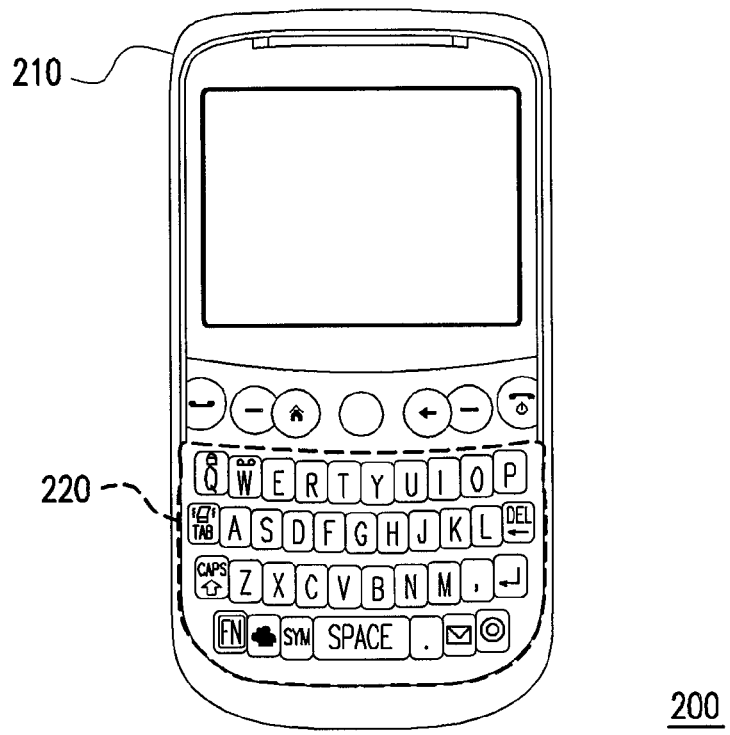
Figure 6:
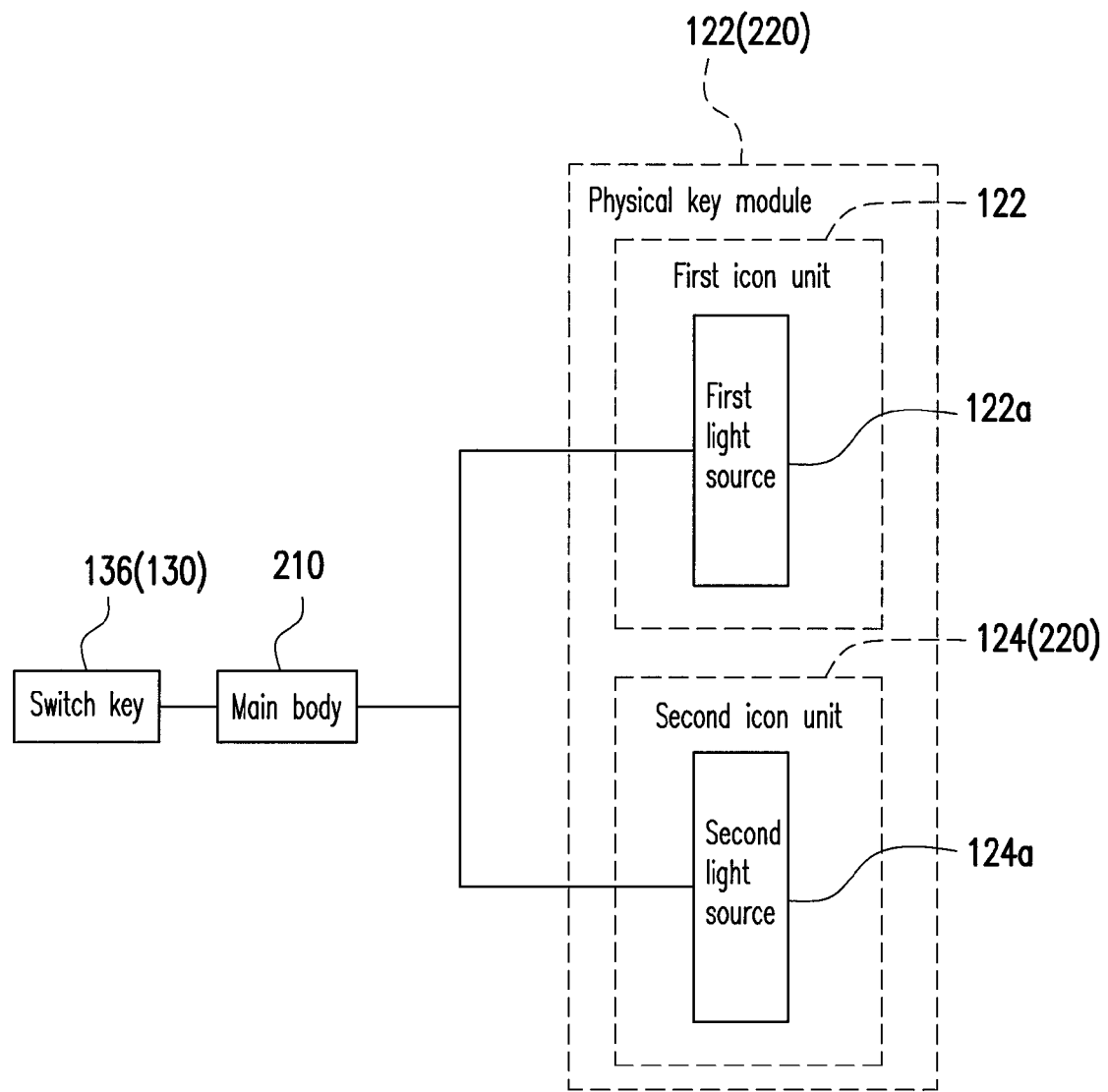
FIG. 6 is block diagram illustrating a physical key module and a main body in a portable electronic device of FIG. 5A and FIG. 5B.

FIG. 5A and FIG. 5B are schematic diagrams illustrating a portable electronic device in different operating states according to another embodiment of the invention. FIG. 6 is a block diagram illustrating a physical key module and a main body in the portable electronic device of FIG. 5A and FIG. 5B, in which a coupling relation of the physical key module and the main body is illustrated.

Referring to FIG. 5A, FIG. 5B and FIG. 6, a difference between the portable electronic device 200 of the present embodiment and that of the aforementioned embodiment is that the control module 130 includes a switch key 136, and the switch key 136 is, for example, a physical key (not shown) disposed on a main body 210. The switch key 136 is electrically connected to the main body 210, and is used for controlling the first light source 122a and the second light source 124a through the main body 210. In this way, the portable electronic device 200 can extend key functions of a physical key module 220 by switching to display different icons, so as to improve operability of the portable electronic device 200. In the present embodiment, in the first operating state, the portable electronic device 200 displays various symbols and numbers as that shown in FIG. 5A. In the second operating state, the portable electronic device 200 displays English letters as that shown in FIG. 5B.

In summary, the control module detects the operating state of the main body, and accordingly activates one of the overlapped icon units, so that the icon of the activated icon unit is displayed on the display surface. In this way, the physical key module of the portable electronic device may display different icons along with different operating states.

Moreover, the control module of the portable electronic device can also be a switch key, which is used for driving the physical key module to switch different icons, so that key functions of the physical key module can be extended, which may increase operability of the portable electronic device.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A portable electronic device, comprising:
a main body;
a physical key module, assembled to the main body, having a display surface, comprising:
a first icon unit, having a first light-guiding film and at least a first icon formed on the first light-guiding film; and
a second icon unit, having a second light-guiding film and at least a second icon formed on the second light-guiding film,
wherein the second light-guiding film and the second icon thereon are stacked atop the first light-guiding film and the first icon thereon; and
a control module, electrically connected to the physical key module, for activating one of the icon units so that an icon of the activated icon unit is displayed on the display surface,
wherein when the main body is in a first operating state, the control module activates the first icon unit and disables the second icon unit, so that the first icon is displayed on the display surface, and when the main body is in a second operating state, the control module disables the first icon unit and activates the second icon unit, so that the second icon is displayed on the display surface,
wherein the first icon unit comprises a first light source electrically connected to the control module and a first light-shielding sheet disposed on the first light-guiding film, the first light-guiding film is disposed aside the first light source, wherein when the main body is in the first operating state, the control module activates the first light source, and when the main body is in the second operating state, the control module disables the first light source, wherein the first light-shielding sheet has a first light-pervious region, the first light-pervious region corresponds to the first icon, a profile of the first light-pervious region is complied with a profile of the first icon, and an area of the first light-pervious region is smaller than or equal to an area of the first icon, wherein the second icon unit comprises a second light source electrically connected to the control module and a second light-shielding sheet disposed on the second light-guiding film, the second light guiding film is disposed aside the second light source, wherein when the main body is in the second operating state, the control module activates the second light source, and when the main body is in the first operating state, the control module disables the second light source, and wherein the second light-shielding sheet has a second light-pervious region, the second light-pervious region corresponds to the second icon and the first icon, and an area of the second light-pervious region is greater than or equal to an area of the first icon, and is greater than or equal to an area of the second icon.

2. The portable electronic device as claimed in claim 1, wherein an orthogonal projection of the first icon on the display surface is partially coincident to an orthogonal projection of the second icon on the display surface.

3. The portable electronic device as claimed in claim 1, wherein a profile of the first icon is complied with a profile of the second icon, and after an orthogonal projection of the first icon on the display surface is rotated by an angle, it is completely coincident to an orthogonal projection of the second icon on the display surface.

4. The portable electronic device as claimed in claim 3, wherein the first operating state of the main body is a portrait mode, and the second operating state of the main body is a landscape mode, and after the orthogonal projection of the first icon on the display surface is rotated by 90 degrees, it is completely coincident to the orthogonal projection of the second icon on the display surface.

5. The portable electronic device as claimed in claim 1, wherein the first light source and the second light source are respectively a light emitting diode.

6. The portable electronic device as claimed in claim 1, wherein the physical key module further comprises:
 a third light-shielding sheet, disposed between the first light source and the second light-guiding film for shielding light of the first light source from transmitting to the second light-guiding film; and
 a fourth light-shielding sheet, disposed between the second light source and the first light-guiding film for shielding light of the second light source from transmitting to the first light-guiding film.

7. The portable electronic device as claimed in claim 1, wherein the control module comprises:
 a controller, electrically connected to the first icon unit and the second icon unit; and
 a gravity sensor, electrically connected to the controller, for sensing whether the main body is in the first operating state or the second operating state.

8. The portable electronic device as claimed in claim 1, wherein the control module further comprises:
 a switch key, electrically connected to the main body, for driving the main body to activate one of the icon units.

9. A method for switching icons, adapted to a portable electronic device comprising a main body, a physical key module and a control module, wherein the physical key module is assembled to the main body, the physical key module has a display surface, and comprises a first icon unit and a second icon unit overlapped to the first icon unit, the second icon unit is located between the first icon unit and the display surface, the first icon unit has at least a first icon, and the second icon unit has at least a second icon, and the control module is electrically connected to the first icon unit and the second icon unit, and the method for switching icons comprising:
 the control module determining an operating state of the main body;
 when the main body is in a first operating state, the control module activating the first icon unit and closing the second icon unit, so that the first icon is displayed on the display surface; and
 when the main body is in a second operating state, the control module activating the second icon unit and closing the first icon unit, so that the second icon is displayed on the display surface,
 wherein a profile of the first icon is complied with a profile of the second icon and after an orthogonal projection of the first icon on the display surface is rotated by 90 degrees, it is completely coincident to an orthogonal projection of the second icon on the display surface.

10. The method for switching icons as claimed in claim 9, wherein the control module comprises a gravity sensor for sensing the operating state of the main body.

11. The method for switching icons as claimed in claim 10, wherein the first operating state of the main body is a portrait mode, and the second operating state of the main body is a landscape mode.

* * * * *